Jan. 23, 1962 H. C. N. HECKEL ET AL 3,018,321
ARTICLE OF MANUFACTURE COMPRISING AN INSULATED
ELECTRICAL CONDUCTOR AND METHOD OF MAKING
Filed Aug. 28, 1958 3 Sheets-Sheet 1
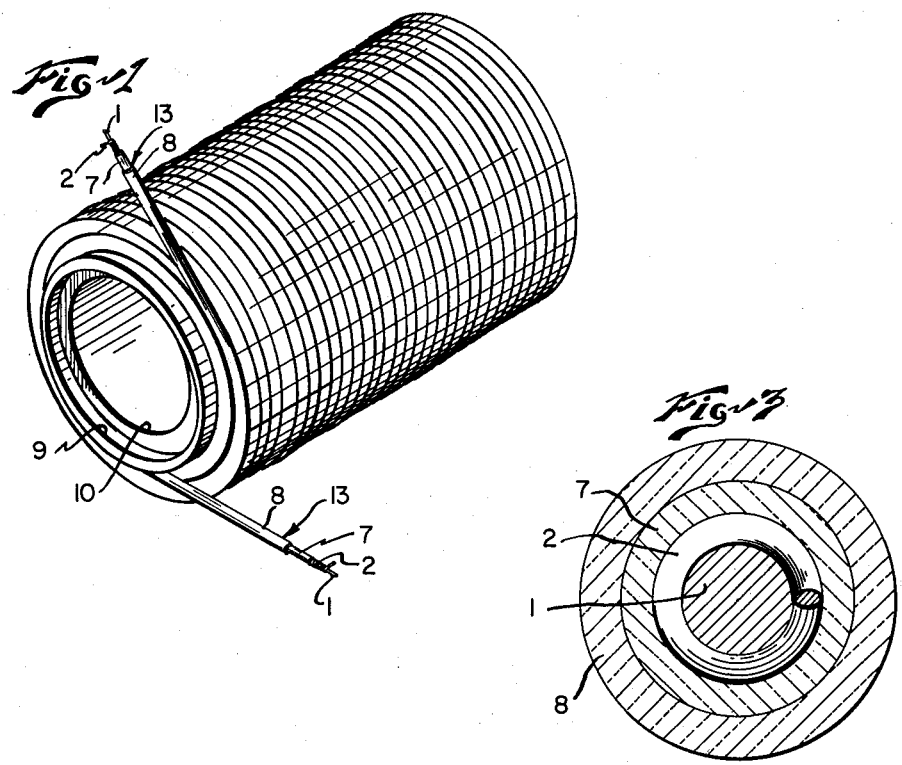
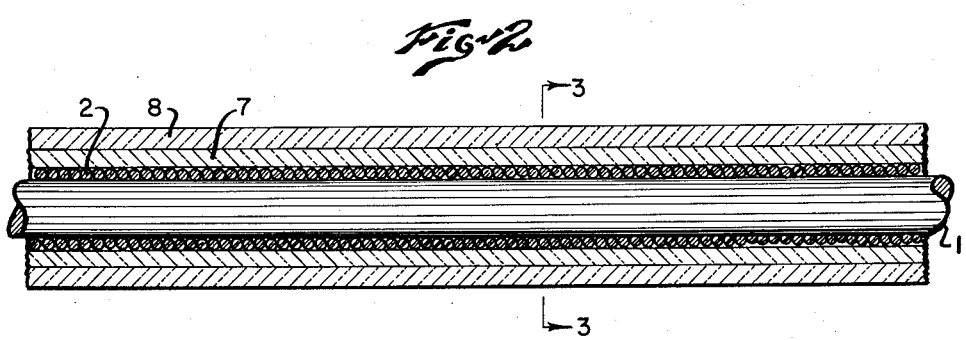
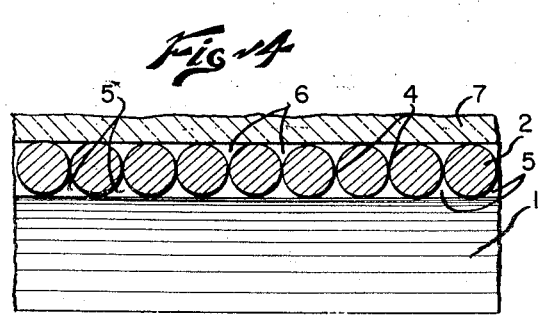
INVENTOR.
HERMANN C.N. HECKEL
ROBERT T. JEFFERSON JR.
BY
Toulmin & Toulmin
ATTORNEYS

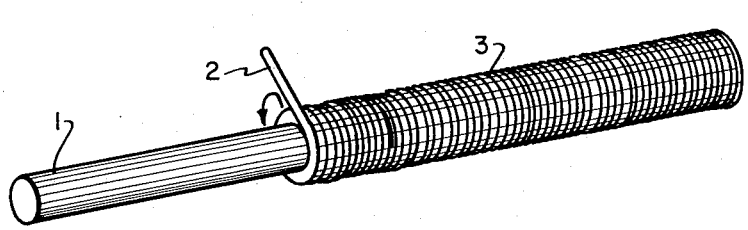
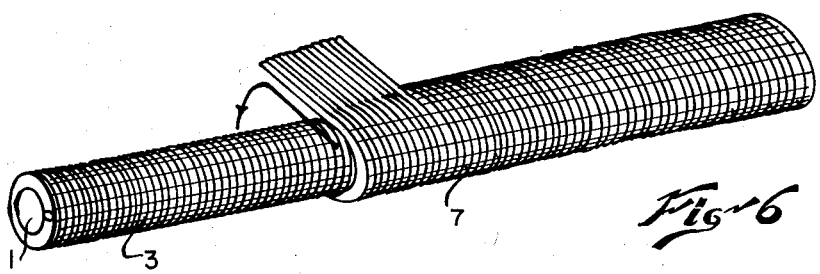
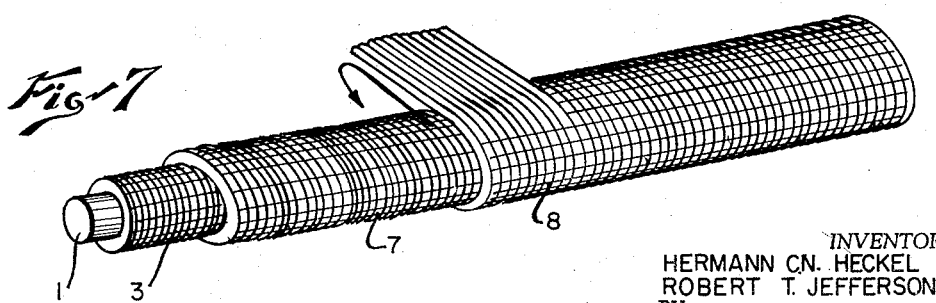
INVENTOR.
HERMANN C.N. HECKEL
ROBERT T. JEFFERSON JR.
BY
ATTORNEYS INVENTOR.
HERMANN C.N. HECKEL
ROBERT T. JEFFERSON JR.
BY
Toulmin & Toulmin
ATTORNEYS

United States Patent Office 3,018,321
Patented Jan. 23, 1962

3,018,321
ARTICLE OF MANUFACTURE COMPRISING AN INSULATED ELECTRICAL CONDUCTOR AND METHOD OF MAKING
Hermann C. N. Heckel, Oxford, and Robert T. Jefferson, Jr., Dayton, Ohio, assignors, by mesne assignments, to Rea Magnet Wire Company, Inc., Fort Wayne, Ind., a corporation of Delaware
Filed Aug. 28, 1958, Ser. No. 757,755
2 Claims. (Cl. 174—110)

This invention relates to improved insulated electrical conductors for high temperature applications, to encapsulated components produced from such conductors and to novel methods of producing the conductors and components.

The successful utilization of inorganic materials such as glass as insulation in electrical components is dependent upon freedom of the insulation from cracks and undue strains. Much effort has been exerted in this field principally by way of matching coefficients of expansion of the insulation and the conductive element.

It has now been found that materially improved freedom from cracks and stresses in the insulation may be had if the electrical conductor is provided to expand or contract without exerting material stress on the insulation around it. This is accomplished by providing the conductor in such manner that expansion of the conductor is substantially wholly taken up within itself. For this purpose the conductor may suitably comprise a structure having voids or expansion cavities in the configuration of the structure into which cavities metal of the structure may expand with temperature change.

Desirably also the conductor structure is not fixedly secured to the insulation surrounding it. Accordingly lineal or longitudinal expansion and contraction of the conductor may occur with temperature change without material stressing of the insulation by the conductor structure.

More specifically, the conductor structure, in a preferred embodiment of the invention, comprises a solid core of copper which is provided over its length with a winding of suitable material, preferably of copper also, but not necessarily an electrically conductive element. The turns of this winding may be in side by side contact to provide between the winding and the core the small voids, which may have the form of a continuous spiral about the core. The voids exist by virtue of the configuration resulting from the provision of the winding on the core, and this is the primary function of the winding.

For example, with a round wire core and a round wire winding, between adjacent turns and the core, a small spacing termed a void of expansion cavity exists. With a given size of round wire forming the core of the void or expansion cavity will be larger, the larger the diameter of the round wire of the winding—the round wire of the winding making essentially a point contact with the core, or a line contact about the core. Between the line contacts the void or expansion cavity provides for metal volumetric expansion.

The core and the winding are not restricted to a round or circular cross-section configuration. For example, ribbon may form the core as well as the winding, the ribbon being slightly overlapped in the winding to occasion void formation.

The conductor structure is suitably provided with a covering of inorganic fibers in the form of yarn, a tape, cloth or the like, and is somewhat yieldable due to interstices between fibers. The covering is not secured to the conductor structure and does not materially affect the free expansion and contraction of the conductor structure. In effect it is a sleeve and provides for longitudinal conductor structure movement, uninhibited other than by the normal friction existing between the components.

The covering serves not only as insulation and as a physical protector of the conductor structure but in addition provides a foundation for receipt of sealing and encapsulating material. This material in a formed component, such as a coil, bonds the insulated turns together and when provided in sufficient quantity affords a complete encapsulation. Suitably such sealing material is applied to the covering in the form of a tape, yarn, fabric or the like and is of inorganic nature; a sheath of siliceous fibers such as glass fibers serve the purpose. The softening point of such sealing material is below that of the softening point of the material of the covering and in the formed component the sealing material is sintered to the covering. The covering, however, is sufficiently impervious that it is not penetrated by the sealing material but is simply adhered to the covering.

To provide an electrical component, for example a coil, the novel electrical conductor is wound to provide the desired number of turns and in the usual manner. The spool, where utilized, should be of a heat resistant material such as a ceramic. The coil, wound on the spool, is then fired at a temperature sufficient to sinter the material of the sheath to cause the material to adhere to the covering when the composite is cooled. The sintering or softening is sufficient to cause the adjacent turns to be coated over lightly with a non-porous film of glass, and when flow of the material of the sheath is limited the individual turns of the coil are clearly distinguishable in the outer coil layer.

With a larger quantity of the lower softening point material, softened sufficiently to flow, the turns may be completely covered.

Preferably, however, only sufficient of the sheath material is utilized to effect the sintering; no material penetration of the fibers of the covering and no substantial hardening of the fluffy fibers of the covering occurs. Encapsulation of the coil is then effected by the application of further material such as that of the sheath and effecting fusion to cause the surrounding of the coil with the encapsulating material.

The coil, encapsulated or not, is then utilizable under high temperature conditions, limited only by the fusion point of the material of the sheath or encapsulation.

In operation, as well as during manufacture, the covering and the sheath protect the conductive structure from oxidation.

The coverings which have been found useful include silica materials such as high silica content glasses, aluminum silicate and mica products. The covering is applied in a fibrous form, that is as a yarn, for example; this fibrous form is retained after the firing and accordingly the covering provides a cushion effect as the copper shrinks, thus inhibiting the setting up of strains in the glass of the sheath.

Further, the covering protects the copper from the material of the sheath which is of lower softening point and usually more reactive chemically than the covering material. In addition oxidation of the copper itself is inhibited particularly by the film formed from the sheath. If further protection against copper oxidation is desired the copper may be borated or the firing may be effected in an inert atmosphere.

The invention will be more fully understood by reference to the following detailed description and accompanying drawings wherein:

FIGURE 1 is a perspective view of a coil produced in accordance with the invention, with parts broken away to clearly illustrate the relationship of the components;

FIGURE 2 is a longitudinal sectional view of an electrical conductor composite used in the formation of the coil of FIGURE 1;

FIGURE 3 is a sectional view taken on line 3—3 of FIGURE 2;

FIGURE 4 is an enlarged view of a portion of the structure of FIGURE 2;

FIGURE 5 is a view schematically illustrating a step in the manufacture of the electrical conductor composite of FIGURE 2;

FIGURE 6 illustrates a further step in the process of manufacture of the conductor composite;

FIGURE 7 illustrates a final step in the process of forming the electrical conductor composite;

Figure 8:
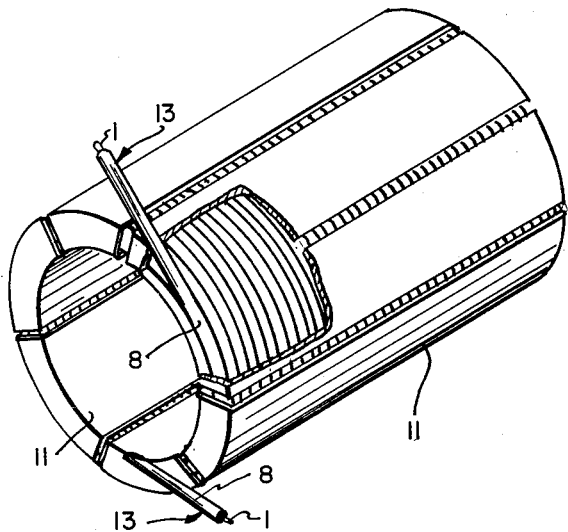
FIGURE 8 illustrates a coil prepared for complete encapsulation.

Referring to the drawings, the numeral 1 designates a solid bare copper wire which may suitably be a No. 18 wire. This wire forms a core upon which there is provided a winding 2 of a bare copper wire, such as a No. 30 wire, having a plurality of turns as indicated at 3 (FIGURE 5). The turns of the wire winding lie in contacting relation, as particularly illustrated in the fragmentary view of FIGURE 4.

The turns, since they form a line contact, or a point contact between adjacent turns, as illustrated in the fragmentary view of FIGURE 4 at 4, define cavities or voids 5 with the conductor 1. The core and winding together form the conductor structure although the winding need not itself be conductive to effect void formation—but it must be of a softening point greater than that of the sheath. Also, due to the configuration of the wire forming the winding 2, cavities or voids are also formed at 6 (FIGURE 4), and the cavities extend around the wire 1 and lengthwise.

When the solid core 1 is subjected to high temperature conditions, either during manufacture of the conductor or in operation, the plurality of voids 5 formed by the provision of the winding 2, affords room for expansion of the solid core. The voids 6 also provide for some expansion of the wire of the winding 2. The wire forming the winding 2 is preferably annealed to inhibit the undue formation of spring tension in the winding 2.

Wrapped about the composite conductor structure just described is a covering 7 of inorganic material and having a high softening point. Suitably the covering 7 is formed of glass or silica fibers or other siliceous bearing material in the form of tape or yarn. Thus Refrasil, a high silica content fiber, i.e. approximately 98 percent silica and the remainder inorganic oxides, and having a softening point well above about 850° C., is suitable for this purpose. The high silica content fiber does not react with the copper or copper oxide of the wire should such oxide form, nor does it react with the material of the outer sheath. The inorganic oxides of the covering are suitably non-alkali to maintain the high softening point.

As shown in FIGURE 6 this covering 7, which is somewhat fluffy and resilient, and suitably in continuous filament form, is applied over the length of the winding 2 and the core 1. Applied to the covering 7 is a sheath 8, also in the form of yarn and of somewhat lower softening point material than the covering 7. For example, it has been found that electrical glass, known commercially as E glass, and treated with methacrylato chromic chloride, has a suitable sintering point, that is, in the neighborhood of 825° C. Such treated glass has a somewhat lower sintering point than E glass itself. Suitable glasses for the purpose are those which are producible in glass fiber form, suitably also continuous filament form, for electrical purposes; one such glass composition is:

| Constituent: | Percentage |
| --- | --- |
| $SiO_2$ | 53.5 |
| $Al_2O_3$ | 14.5 |
| $B_2O_3$ | 10.0 |
| CaO | 17.5 |
| MgO | 4.5 |

Suitably the covering described is present to the extent of about 1.2 grams per foot of length and the sheath has a weight per foot of about 1.5 grams per foot.

The electrical conductor structure shown in FIGURE 2 is flexible and readily formable into a coil structure. For this purpose a spool 10 of a material such as Steatite or other ceramic is provided and the winding is formed thereon in known manner.

When removal of the spool from the winding is desired in the finished product, the spool is itself wound with a high softening point material in tape form, such as aluminum silicate fiber, available commercially as Fiberfrax, and designated at 9 in FIGURE 1. As shown the tape 9 extends slightly beyond the spool to facilitate withdrawal.

To occasion bonding of adjacent insulated turns the wound coil on the spool is subjected to a temperature of about 825–850° C. This occasions a sintering of the material of the sheath 8. The softened sheath material enters interstices of the covering 7 to some slight extent in the firing process. This is not sufficient to harden the insulation of the covering, nor does it rigidly mechanically secure the turns; but it coats the turns and tends to retain them together by a light bond, sufficient to rigidize the coil.

Cooling of the coil is effected preferably very slowly to avoid cracking of the insulation. Thus, it has been found that it is desirable to extend the cooling period over a time of at least several hours.

Specifically, in a preferred practice, the coil having the sheath material 8 is cooled slowly to about 650° C., the glass of the sheath 8 is itself hardened at about 800° C. Suitably the coil is maintained at 650° C. for about one-half hour and then cooled slowly to 550° C. over a period of about one hour. The coil is then held at 550° C. for another hour to relieve any strains which may have occurred. Then the coil is cooled slowly over a period of about two hours to room temperature.

In the initial stages of the cooling the glass is in a plastic state while the copper shrinks as the temperature of the glass approaches the annealing point. At the annealing point the glass sets hard and the copper shrinks more in volume than does the glass. Since, however, the high softening point material is not bonded to the metal, the copper may shrink freely in any direction without occasioning strains in the glass; the covering material towards which shrinkage takes place tends to cushion the effect of the shrinkage and deleterious strains are not set up in the insulation. The annealing point of the E-glass referred to hereinbefore lies between about 500° C. and 650° C., and accordingly considerable shrinkage of the copper occurs after the annealing point has been reached.

Due to the differences in coefficient of expansion the glass would normally be cracked if there were adherence to any material extent between the glass and copper. However, with the covering providing for linear or longitudinal movement of the copper within the covering, and since there is no secure bonding between the copper wire and the covering, cracking of the glass is inhibited.

It is to be noted that the sintered glass usually is milky white in contrast to glass which has been fully melted and appears quite clear.

The product of the operation thus described results in a coil, the insulated turns of which are visible (FIGURE 1). If desired the spool and tape 9 may be removed by drawing on the aluminum silicate tape to release the spool.

To completely encapsulate the coil a winding 11 of yarn, as illustrated in FIGURE 8, may be applied to the now self-supporting coil. The winding 11 in this instance is suitably of the E-glass material like the sheath 8. The yarn is passed through the opening 12 of the formed coil of FIGURE 1 and along the outer side of the coil; depending upon the amount of material required, a number (FIGURE 8) of such yarns may be so passed through the formed coil. Suitably the coil leads 13 are formed integral with the winding, as is clearly shown in FIGURE 1.

Figure 9:
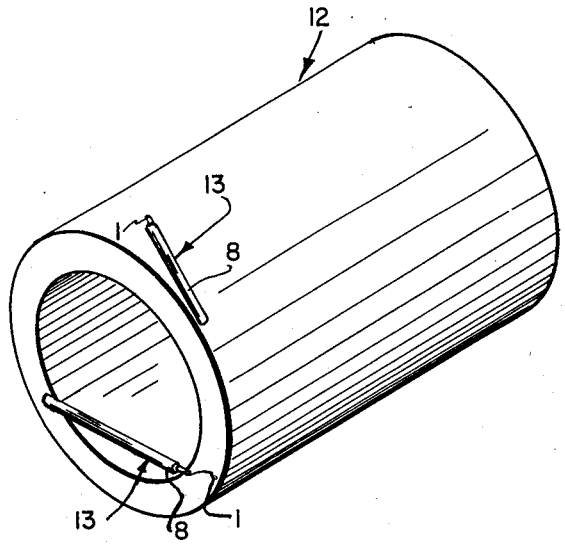
FIGURE 9 illustrates a fully encapsulated coil.

The structure illustrated in FIGURE 8 is then fired at a temperature of approximately 825° C. or higher to cause complete flow of the material of the yarn winding 11. This material enters between the turns of the winding and coats over the turns, fully encapsulating the product, as is shown in FIGURE 9, but does not penetrate to the conductor structure.

A coil supported with a core may be similarly encapsulated by providing the encapsulating material around the coil circumference.

It is important to note that both in operation and in the process of manufacture the voids or expansion cavities provide for the expansion and the contraction of the copper or other conductive material without the exertion of stress on the insulation.

Figure 10:
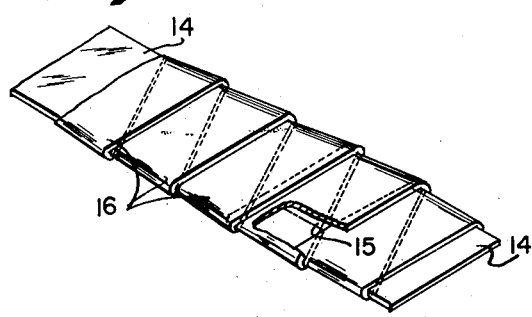
FIGURE 10 is a view similar to that of FIGURE 4 illustrating a further embodiment of the invention.

Referring now to FIGURE 10 expansion cavities 15 may also be formed when a conductor 14 is in the form of a ribbon and the winding has overlapping turns 16, also of ribbon. The voids in this instance are formed by the overlapping turns and the conductor 14, as is clearly illustrated in FIGURE 10.

Coils such as illustrated in FIGURE 1 and formed as described have, when cooled, show no cracking and have maintained their integrity when 5000 volts have been applied across the coil.

This achievement of producing the coil free from cracking is considered to result because of the freedom of the core and winding of wire 2, that is, the conductor structure, to expand and contract volumetrically with temperature change. This is particularly evident when encapsulating for the E glass, for example, shrinks considerably causing some volume change in the coil, but the structure is sufficiently resilient that cracking does not occur. The provision of the central conductive body which, in the embodiment described, includes the core 1 and winding of wire 2, in such manner as to change volume without undue stress on the insulation, occasions the desired crack-free result.

As will be noted from the structure described, wherein the expansion cavities adjacent the core, when contraction of the copper of the coil occurs in cooling, the insulating material, in addition to permitting movement of the conductor, provides also for a cushioning effect between adjacent layers. Mica tape and aluminum silicate fibers may be used as the covering, though mica does not have quite the cushioning effect of more fibrous materials.

It will be understood that this invention is susceptible to modification in order to adapt it to different usages and conditions and accordingly, it is desired to comprehend such modifications within this invention as may fall within the scope of the appended claims.

What is claimed is:

1. An insulated electrical conductor having an electrical insulating covering loosely mounted thereon and comprising an electrically conductive copper coil structure which expands with temperature rise, said coil structure consisting of a solid core of copper metal and a winding of copper wire spirally wound in closely packed turns on said copper metal core and providing expansion cavities thereon and between said winding of copper wire, an inner covering of fluffy resilient silica fiber material surrounding said winding and core structure and forming a slippable sleeve covering insulation over said coil structure and forming a slidable covering relative to said winding, said cavities providing said core with a capacity for expansion without the formation of substantial stress on the insulating material, and an outer sheath of fibrous siliceous insulation material integrally united with the outer filaments of said covering, said outer sheath of siliceous fibrous insulation material having a softening temperature of about 825° C. and lower than the softening temperature of said inner covering material, and said outer sheath of siliceous material being sintered to said inner covering fiber material.

2. An insulated electrical conductor as set forth in claim 1, wherein said covering consists of a fluffy resilient continuous filament of low melting point glass, and said sheath being composed of fibrous glass in the form of a tape adhering to said covering and having a lower softening temperature point than said covering filament material.

References Cited in the file of this patent

UNITED STATES PATENTS

| | | |
|---|---|---|
| 2,075,906 | Maude | Apr. 6, 1937 |
| 2,504,764 | Vollrath | Apr. 18, 1950 |
| 2,848,794 | Roth | Aug. 26, 1958 |
| 2,867,032 | Gehrke et al. | Jan. 6, 1959 |

FOREIGN PATENTS

| | | |
|---|---|---|
| 25,095 | Great Britain | of 1898 |
| 710,711 | Great Britain | June 16, 1954 |